United States Patent
Tanaka et al.

(10) Patent No.: US 6,200,409 B1
(45) Date of Patent: Mar. 13, 2001

(54) METHOD AND APPARATUS FOR MANUFACTURING METALLIC SHEET COVERED WITH THERMOPLASTIC RESIN

(75) Inventors: Atsuo Tanaka; Yoshiki Sakamoto; Noriaki Kaguma, all of Yamaguchi-ken (JP)

(73) Assignee: Toyo Kohan., Ltd., Tokyo (JP)

( * ) Notice: Subject to any disclaimer, the term of this patent is extended or adjusted under 35 U.S.C. 154(b) by 0 days.

(21) Appl. No.: 09/180,718

(22) PCT Filed: May 14, 1997

(86) PCT No.: PCT/JP97/01622

§ 371 Date: Nov. 13, 1998

§ 102(e) Date: Nov. 13, 1998

(87) PCT Pub. No.: WO97/43118

PCT Pub. Date: Nov. 20, 1997

(30) Foreign Application Priority Data

May 14, 1996 (JP) .................................................. 8-142377

(51) Int. Cl.⁷ .............................. B32B 15/08; B32B 31/26
(52) U.S. Cl. ...................................... 156/309.9; 156/308.2; 156/322; 156/324; 156/499; 156/555
(58) Field of Search ........................... 156/308.2, 309.9, 156/322, 324, 499, 555, 583.1

(56) References Cited

U.S. PATENT DOCUMENTS

| | | | |
|---|---|---|---|
| 3,959,567 | * | 5/1976 | Bradley ................................ 428/461 |
| 5,283,017 | * | 2/1994 | Rohleder et al. ....................... 264/25 |
| 5,518,570 | * | 5/1996 | Takagi et al. ......................... 156/303 |
| 5,679,200 | * | 10/1997 | Newcomb et al. ................. 156/308.2 |
| 5,686,043 | * | 11/1997 | Hammond et al. .................. 266/112 |
| 5,695,579 | * | 12/1997 | Rowland ................................ 156/64 |
| 5,738,754 | * | 4/1998 | Hill et al. ............................. 156/555 |
| 5,840,152 | * | 11/1998 | Billgren et al. ....................... 156/498 |

FOREIGN PATENT DOCUMENTS

| | | |
|---|---|---|
| 63-280627 | 11/1988 | (JP) . |
| 1-154746 | 6/1989 | (JP) . |
| 5-269857 | 10/1993 | (JP) . |
| 6-008335 | 1/1994 | (JP) . |
| 6-008336 | 1/1994 | (JP) . |
| 6-270363 | 9/1994 | (JP) . |
| 7-214724 | 8/1995 | (JP) . |

* cited by examiner

*Primary Examiner*—James Sells
(74) *Attorney, Agent, or Firm*—Browdy And Neimark

(57) ABSTRACT

It is an object of the present invention to provide a method of and an apparatus for manufacturing a resin coated metal sheet, in which it is possible to reduce bubbles included between a laminated resin film and a metal sheet even when a thermoplastic resin film is laminated onto a web-shaped metal sheet even at high speed, and the laminated resin film is excellent in formable adhesion. The method of manufacturing a resin coated metal sheet comprises the steps of heating a web-shaped metal sheet (1), which advances continuously, supplying a thermoplastic resin film (5), which is heated to below a softening temperature of the thermoplastic resin film and to at least a surface temperature of a lamination roll (7), to a nip of the lamination rolls while maintaining the thermoplastic resin film at a higher temperature than the surface temperature of the lamination roll (7), and pressure-welding the metal sheet (1) and the thermoplastic resin film (5) against each other to laminate them.

15 Claims, 3 Drawing Sheets

METHOD AND APPARATUS FOR MANUFACTURING METALLIC SHEET COVERED WITH THERMOPLASTIC RESIN

FIELD OF THE INVENTION

The present invention relates to a method and an apparatus for manufacturing a thermoplastic resin coated metal sheet (hereinafter referred to simply as a resin coated metal sheet), which can effect high speed production thereof. More particularly, it relates to a method and an apparatus for manufacturing a resin coated metal sheet, which make it possible to reduce bubbles generated in a laminate when a thermoplastic resin film (hereinafter referred to simply as a resin film) is laminated onto a metal sheet at high speed, and also make it possible to manufacture a resin coated metal sheet having excellent adhesion after forming of a laminated resin film to a metal sheet at high speed.

BACKGROUND OF THE INVENTION

Recently, an increasing amount of material which is prepared by laminating a thermoplastic resin film such as polyester resin film to both surfaces of a metal sheet has been used for heavily formed cans such as drawn cans and drawn and stretch-formed cans. A resin coated metal sheet used for such heavily formed cans is manufactured by a method of heat bonding a resin film to a metal sheet or a method of laminating a resin film into a metal sheet by means of a thermosetting adhesive therebetween. There arises no particular problem in both methods as far as the resin film is laminated on the metal sheet at low speed. However, when the resin film is laminated onto the metal sheet at a high speed of at least 200 m/min., the resultant resin coated metal sheet has bubbles included between the laminated resin film and the metal sheet and a ratio of the thus included bubbles to the resin coated metal sheet comes to about 10 to 30% by an area ratio. Such inclusion of bubbles not only causes decrease in the adhesion after forming of the laminated resin film but also causes surface roughness of the resin coated metal sheet, which results in flaws of the resin coated metal sheet at the time of forming. Therefore, the lamination speed at the time of laminating a resin film to a metal sheet has been limited to a low speed form the view of reducing bubbles at present.

In the method of continuously laminating a resin film onto a metal sheet, various techniques for preventing bubbles from being included between the laminated resin film and the metal sheet have been proposed as follows.

(1) Japanese Patent Laid-open Publication No. HEI-5-269857 discloses a method in which the surface roughness of a metal sheet is set to 0.5 μm or less, and a space defined by an intermediate roll and a seal roll which are disposed before a pressure roll is conditioned under a reduced pressure of 50 Torr or less.

(2) Japanese Patent Laid-open Publications Nos. HEI-6-8335 and HEI-6-8336 disclose a method in which the diameter of a laminating roll, the thickness of a rubber lining of the laminating roll, and the hardness of the rubber roll are respectively fixed, and a backup roll having a larger diameter than the laminating roll is further provided.

(3) Japanese Patent Laid-open Publication No. HEI-6-270363 discloses a method in which a first pressure roll is a steel roll by which a laminate material is roller with a reduction ratio of 0.5 to 2.0% and a second pressure roll is a rubber lining roll, and the laminate material is press-bonded with a nip width of 10 m or more.

(4) Japanese Patent Laid-open Publication No. HEI-7-186353 discloses a method in which a seal roll for nipping a metal sheet strip is disposed on an upstream side of a pressure roll, and intermediate roll is further provided in contact with these rolls, and a space defined by these rolls is conditioned under a reduced pressure, and a resin film is laminated on the metal sheet strip under such conditions.

(5) Japanese Patent Laid-open Publication No. HEI-7-214724 discloses a method in which a gas is blown from a gas jet nozzle against a surface of a metal sheet, which is advancing, in the opposite direction to the advance direction of the metal sheet directly before a resin film is laminated onto the metal sheet.

Considering the case of laminating a resin film to a metal sheet continuously at high speed, these methods (1) to (5) are not sufficiently suitable as the method of manufacturing a resin coated metal sheet for cans which requires excellent formability.

Therefore, it is the object of the present invention to solve the above mentioned problems in the manufacture of a resin coated metal sheet for cans. That is, the object of the present invention is to provide a method and an apparatus for manufacturing a resin coated metal sheet, which make it possible to reduce bubbles included between a laminated resin film and a metal sheet when the resin film is continuously laminated onto the metal sheet at a high speed of at least 200 m/min. and which make it also possible to impart excellent adhesion after forming to the laminated resin film of the resin coated metal sheet thus manufactured.

DISCLOSURE OF THE INVENTION

The present invention comprises a method of manufacturing a thermoplastic resin coated metal sheet, which includes the steps of heating a metal sheet strip, which advances continuously, to a temperature of or higher than a melting point of a thermoplastic resin film, bringing the thermoplastic resin film into contact with at least one surface of the metal sheet, and nipping the metal sheet and the thermoplastic resin film by a pair of laminating rolls to laminate them, wherein the thermoplastic resin film, which is heated to a temperature of at least a surface temperature of the laminating rolls and below a softening temperature of the thermoplastic resin film, is brought into contact with at least one surface of the metal sheet and the metal sheet and the thermoplastic resin film are nipped by the laminating rolls to be laminated to each other.

The method is characterized in that when said heated thermoplastic resin film is brought into contact with said metal sheet and both are nipped to be laminated to each other by said laminating rolls, said heated thermoplastic resin film and said laminating rolls are made to contact with each other within 0.1 second.

The present invention comprises an apparatus for manufacturing a thermoplastic resin coated metal sheet, which includes metal sheet supplying means for continuously feeding a metal sheet strip, a heating means for heating the metal sheet to a temperature of a least a melting point of a thermoplastic resin film, a pair of laminating rolls, and a thermoplastic resin film supplying means for continuously feeding a thermoplastic resin film between the laminating rolls and the metal sheet, the apparatus further including a thermoplastic resin film heating means for heating the thermoplastic resin film to a temperature of at least a surface temperature of the laminating rolls and below a softening temperature of the thermoplastic resin film directly before the thermoplastic resin film is made to contact with the metal sheet.

The apparatus is characterized in that a first deflector roll is provided between the thermoplastic resin film supplying means and the laminating rolls so as to come into contact with one surface of the thermoplastic resin film and it is movably, disposed so as to permit a winding angle of the thermoplastic resin film around the laminating roll to be changed.

It is further characterized in that the thermoplastic resin film heating means is a heating roll which is disposed between the thermoplastic resin film supplying means and the laminating rolls so as to come into contact with one surface of the thermoplastic resin film.

It is still further characterized in that the heating roll also serves as a deflector roll which is disposed movably in the direction perpendicular to the advance direction of the metal sheet so as to permit the winding angle of the thermoplastic resin film around the laminating roll to be changed.

It is still further characterized in that a second heating means for heating the thermoplastic resin film is provided between the heating roll and the laminating rolls.

It is still further characterized in that the second heating means is an infrared heater.

It is still further characterized in that a second deflector roll is provided between the thermoplastic resin film supplying means and the heating roll so as to come into contact with one surface of the thermoplastic resin film and it is disposed movably in the direction perpendicular to the advance direction of the thermoplastic resin film.

BEST MODE FOR CARRYING OUT THE INVENTION

The method of manufacturing a thermoplastic resin (hereinafter referred to simply as a resin) coated metal sheet comprises the steps of heating a metal sheet strip, which advances continuously, brining a resin film, which is heated to a predetermined temperature of at least a surface temperature of a laminating roll and below a softening temperature of the resin film, into contact with at least one surface of the metal sheet, wherein the resin film is made to contact with the laminating roll in a very short contacting duration, and nipping the resin film and the metal sheet in contact with each other by a pair of laminating rolls to laminate them, so that it is possible to reduce bubbles included between the laminated resin film and the metal sheet and particularly it is possible to effectively reduce such bubbles when the resin film is laminated onto the metal sheet at high speed.

Figure 1:
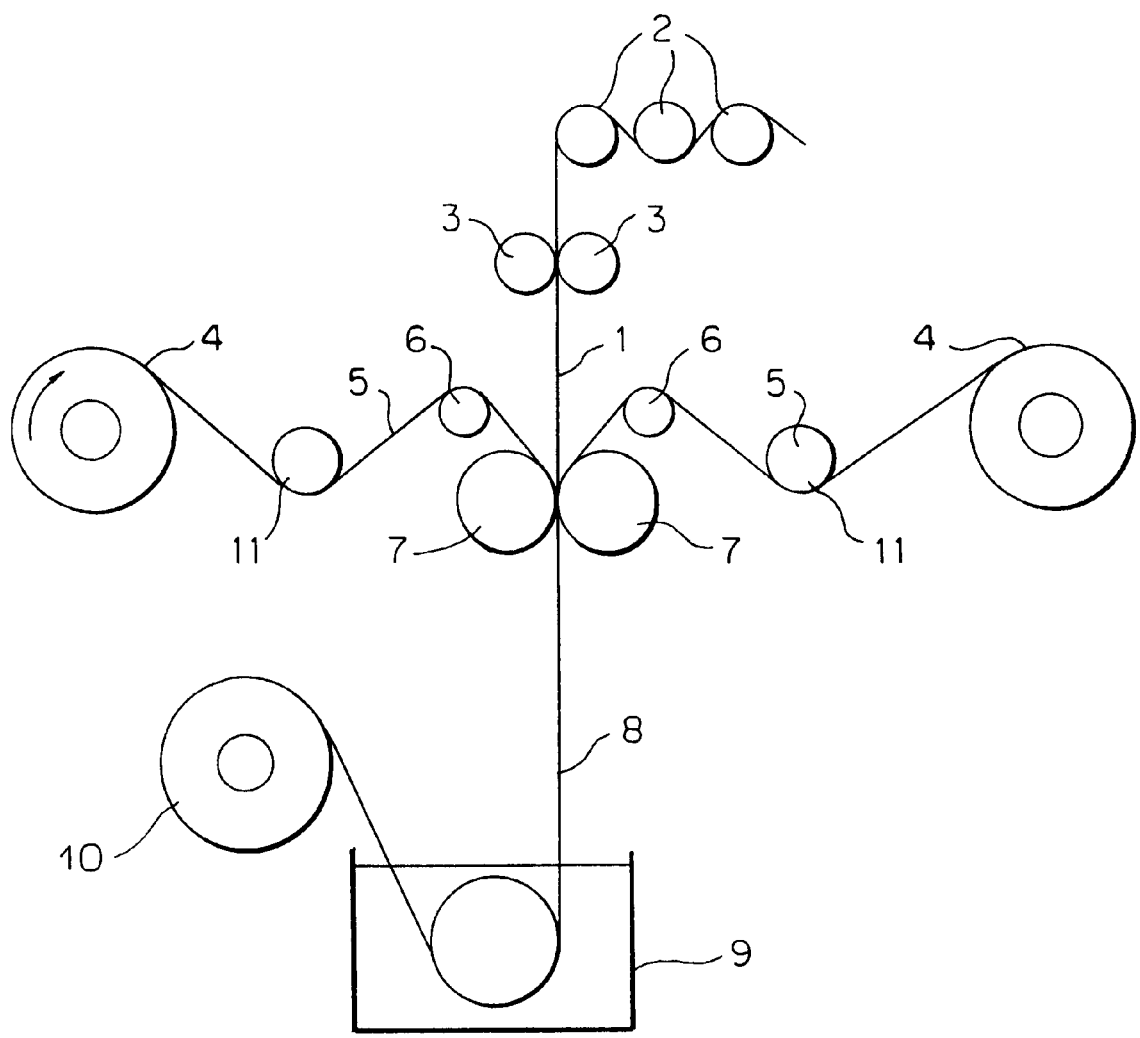
FIG. 1 is a schematic view showing an embodiment of an apparatus for manufacturing a resin coated metal sheet according to the present invention.
Figure 3:
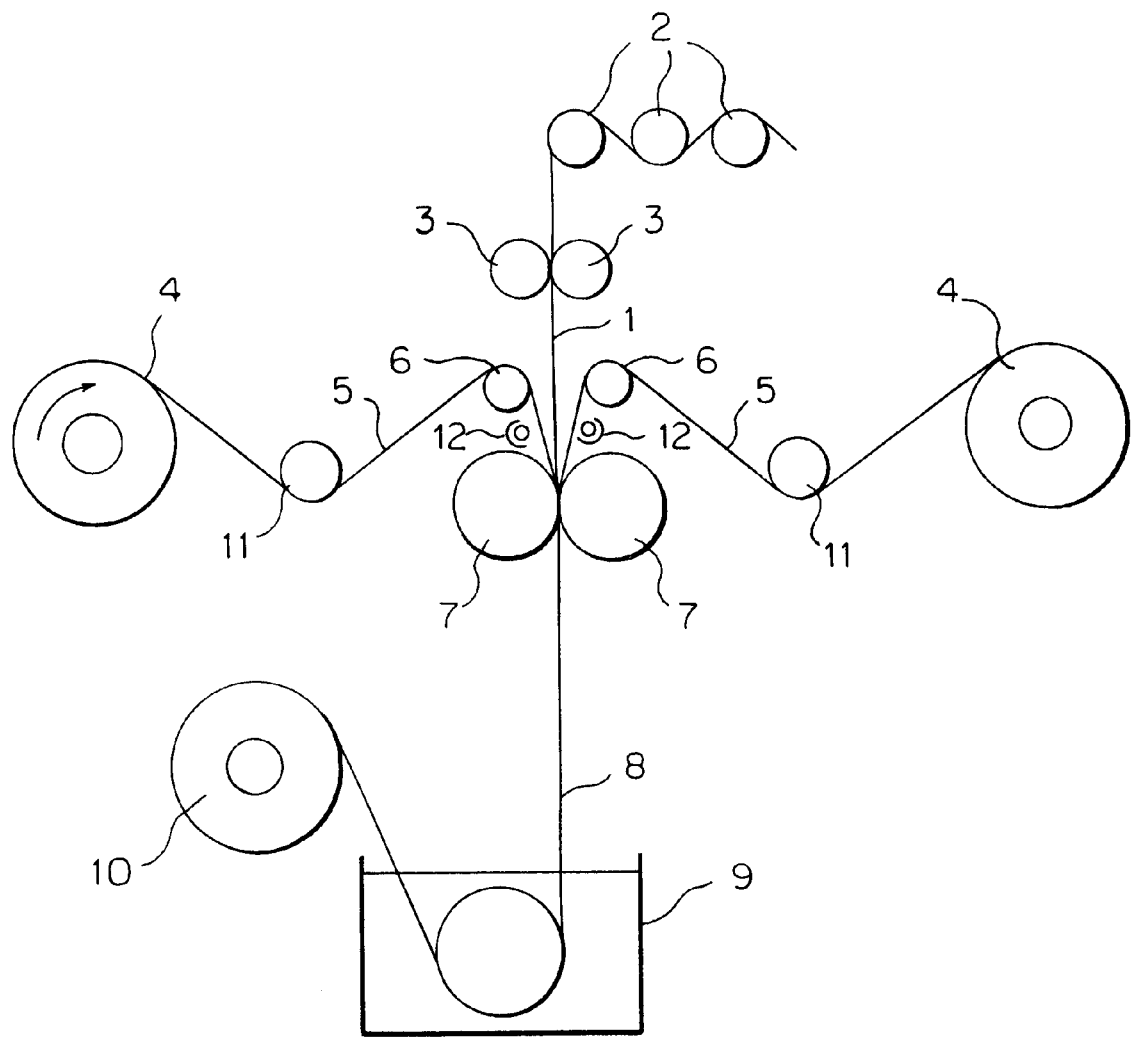
FIG. 3 is a schematic view showing another embodiment of the apparatus for manufacturing a resin coated metal sheet according to the present invention.

FIG. 1 is a schematic view showing a main structure by way of an example of the embodiment of the apparatus according to the present invention. Namely, FIG. 1 shows an example of the apparatus for laminating a resin film 5 onto both surfaces of a metal sheet 1, in which symbol 2 is a heating means for continuously heating a metal sheet strip, which is fed from a metal sheet supplying means (not shown) and continuously advances downward from the upside in FIG. 1, further a final heating means 3 for controlling the temperature of the heated metal sheet 1 to a predetermined temperature is disposed below the heating means 2, and further below the heating means, a pair of laminating rolls 7 are disposed for nipping the heated metal sheet 1 and a resin film 5 fed from a resin film supplying means 4 and applying a pressure to them to heat-bond them. In the apparatus, further a heating roll 6 is provided as a heating means for heating the resin film 5 fed from the resin film supplying means 4 to a predetermined temperature. The heating roll 6 is disposed so as to come into contact with one surface of the resin film 5 and may be a deflector roll movable in a direction perpendicular to the advance direction of the metal sheet 1. The heating roll 6 may serves as the deflector roll as mentioned above, or may be a deflector roll provided with or without a heating means and another heating means 12 may be provided between this deflector roll and the laminating roll 7 as shown in FIG. 3. Further, a second deflector roll 11 is provided between the resin film supplying means 4 and the lamination roll 7 so as to come into contact with one surface of the resin film 5 and it is movable in a direction perpendicular to the advance direction of the resin film 5. Besides, a known device for controlling a tension of the resin film (not shown) is provided between the resin film supplying means 4 and the heating means 6. Further, a quenching tank 9 is provided below the pair of laminating rolls for quenching an obtained resin coated metal sheet 8 to a normal temperature and a coiling means 10 is disposed on the downstream thereof for coiling the resin coated metal sheet 8.

As above mentioned heating means 2 for heating the metal sheet 1, the final heating means 3 for controlling the temperature of the metal sheet 1 to a predetermined temperature, and the heating means 6 for heating the resin film, known heating devices such as heating rolls using induction heating or superheated steam as heating means, a high-frequency heating device, a resistance heating device, and a hot blast hearth may be applicable. Among them, a metallic heating roll which incorporates an induction coil may be used more preferably from the viewpoint of accurately controlling the surface temperature of the roll. Hereafter, the present invention is explained with respect to a case of using the heating roll as the heating means 6.

The heating roll 6 is rotatable with its both ends supported by bearings (not shown), wherein both bearings are synchronized with each other by an air cylinder or the like so as to serve as a deflector roll which is movable in any direction of right and left direction, up- and downward direction, an oblique direction, and an arc direction on the plane of FIG. 1. Thus, the heating roll 6 is permitted to move for varying a winding angle of the resin film 5 around the laminating roll 7 so that it is possible to vary the contracting duration of the resin film 5 with the laminating roll 7. Although the heating roll 6 can be moved in any direction of right and left directions, up- and downward directions, an oblique direction, and an arc direction on the plane of FIG. 1, it may preferably be moved in the right and left directions, that is, in the direction perpendicular to the advance direction of the metal sheet 1 on the plan of FIG. 1, because the right- and leftward movement of the heating roll 6 allows the winding angle to be remarkably varied only by a short distance movement. Otherwise, as shown in FIG. 3, the heating roll 6 may be a deflector roll, which is provided with or without a heating means, and another heating means 12, an infrared heater, for instance, may be provided between this deflector roll and the laminating roll 7.

Further, it is possible for the resin film 5 fed from the resin film supplying means 4 to change its advance direction by a deflector roll 11, which is disposed so as to come into contact with one surface of the resin film 5 and movable in a direction perpendicular to the advance direction of the resin film 5. This deflector roll 11 also serves to adjust the winding angle of the resin film 5 around the resin film heating roll 6 so as to permit the contacting duration of the resin film 5 with the resin film heating roll 6 to be controlled, similarly to the above mentioned adjustment for the movement of the resin film heating roll 6.

The manufacturing apparatus for the resin coated metal sheet of the present invention constructed as mentioned above is operated as follows. First, a metal sheet strip is heated by heating means 2 and heated to a predetermined temperature of at least a melting point of a resin film 5 by the final heating means 3. At least one surface of the thus heated metal sheet 1 is made to contact with resin film 5. The resin film 5, which is fed from the resin film supplying means 4 with a tension of 2 to 14 N/m m$^2$ imparted thereto by a resin film tension controlling device (not shown), is fed to the resin film heating means 6 with a predetermined winding angle fixed by moving the deflector roll 11 and the resin film heating means 6, wherein the resin film 5 is heated to a predetermined temperature of at least the surface temperature of the laminating roll 7 and below the softening temperature of the resin film 5 by the resin film heating means 6, and the thus heated resin film 5 is brought into contact with the laminating roll 7. As soon as the resin film 5 comes into contact with the laminating roll 7, it is fed, within 0.1 second, into the pair of laminating rolls 7 together with the metal sheet 1 and they are nipped by the lamination rolls 7 to be laminated to each other. Thus, the laminating operation is completed. The resultant resin coated metal sheet 8 is guided into the quenching tank 9 and quenched, then dried by a drying device (not shown), and winded in a coil form by a resin coated metal sheet coiling means 10.

The present invention is characterized in that, in the above mentioned manufacturing method for the resin coated metal sheet, the resin film to be laminated onto the metal sheet is heated to a predetermined temperature of at least the surface temperature of the laminating roll and below the softening temperature of the resin film and brought into contact with the laminating roll, and thereafter within 0.1 second it is made to contact with the metal sheet, and both of them are nipped together to be laminated. Now, the method is more specifically explained. First, it is important to maintain the temperature of the resin film to be laminated, which has been heated to a temperature of at least the surface temperature of the laminating roll and below the softening temperature of the resin film, so that the temperature of the resin film should not be lowered below the surface temperature of the laminating roll until the resin film is laminated onto the metal sheet in a nip of the lamination rolls. Besides, it is necessary to restrict the contacting duration of the resin film with the laminating roll. The reason is as follows. When the contacting duration of the resin film with the laminating roll is longer, even if the resin film is heated above the surface temperature of the laminating roll, it is rapidly cooled by the laminating roll and its temperature becomes substantially equal to the surface temperature of the laminating roll. That is, the temperature of the resin film becomes same as the surface temperature of the laminating roll before the resin film is fed in a nip of the laminating rolls, resulting in loss of preheating effect. Therefore, the heated resin film needs to come in contact with the laminating roll as soon as possible after heating so as not to be cooled by the atmosphere, and it is necessary to restrict the laminating duration within 0.1 second, which is the duration from when the resin film comes in contact with the laminating roll to when the resin film is made to contact with the metal sheet and both of them are nipped to be laminated to each other. The contacting duration of the resin film with the laminating roll is determined on the basis of a supplying speed of the metal sheet and a nip length of the laminating rolls, as far as the diameter of the laminating roll is fixed. In usual cases, laminating rolls having a fixed diameter is used and the feeding speed of the metal sheet and the nip length are adjusted to control the contacting duration. The nip length is adjusted in accordance with a pressure at the time of pressure-bonding the metal sheet and the resin film by the pair of laminating rolls, so the surface of the laminating roll should essentially be provided with a lining of an elastic material such as rubber.

On the other hand, when the temperature of the resin film is lower than the surface temperature of the laminating roll, the resin film is heated by the laminating roll while it is in contact with the laminating roll. However, even when the temperature of the resin film becomes highest, it is substantially equal to the surface temperature of the laminating roll. When the temperature of the resin film about to come in a nip of the laminating rolls, particularly the temperature of a contacting side of the resin film with the metal sheet, is lower than the surface temperature of the laminating roll, and when the resin film is pressure-bonded to the metal sheet by the pair of laminating rolls, the temperature of the resin film is not so raised through the thermal transfer from the heated metal sheet, which forms a melting layer (bonding layer) only little, resulting in decreased adhesion after forming of the laminated resin film. In particular, when the laminating speed for the resin film increases, not only an increasing amount of bubbles are included in the laminate but also the adhesion after forming of the laminated resin film is remarkably decreased.

In the present invention, the heating temperature of the resin film is limited up to the softening temperature of the resin film. This softening temperature of the resin film is determined on the basis of a shrinkage amount of the resin film when the resin film is laminated. This shrinkage of the resin film inevitably occurs because a certain extent of tension is imparted to the resin film at the time of lamination. The area of the resin film to be laminated is decreased by the shrinkage amount thereof and therefore, defective portions of the resin coated metal sheet increase. Normally the produced resin coated metal sheet is cut at both edges thereof by 1.5% with regard to the full width thereof, respectively. Accordingly, if the shrinkage amount of the resin film is 3% or less, the resultant resin coated metal sheet has its defective portions, which are not laminated with the resin film, completely cut-off, and thus there is no unusable portion remaining in the resin coated metal sheet. Therefore, in the state that the resin film is heated and a tension is imparted to the resin film, a heating temperature which causes a shrinkage of at least 3% of the resin film in the width direction is prescribed as a softening temperature of the resin film at the time of lamination and determined as the upper limit of the heating temperature. Normally, if the resin film is a non-oriented film, although it depends on a kind of the resin, its softening temperature is higher than the glass transition temperature by 10 to 30° C., and if the resin film is a biaxially oriented film, its softening temperature is higher than the glass transition temperature by 100° C.

As mentioned above, the resin film 5 is heated to a predetermined temperature by the heating roll. However, as the lamination speed for the resin film increases, the contacting duration of the resin film 5 with the resin film heating roll 6 becomes shorter and hence the temperature of the resin film is less raised. Therefore, it is preferably to move the resin film heating roll 6 and the deflector roll 11 so that the winding angle of the resin film around the resin film heating roll 6 can be increased so as to increase contacting portions of the resin film 5 with the resin film heating roll 6.

Figure 2:
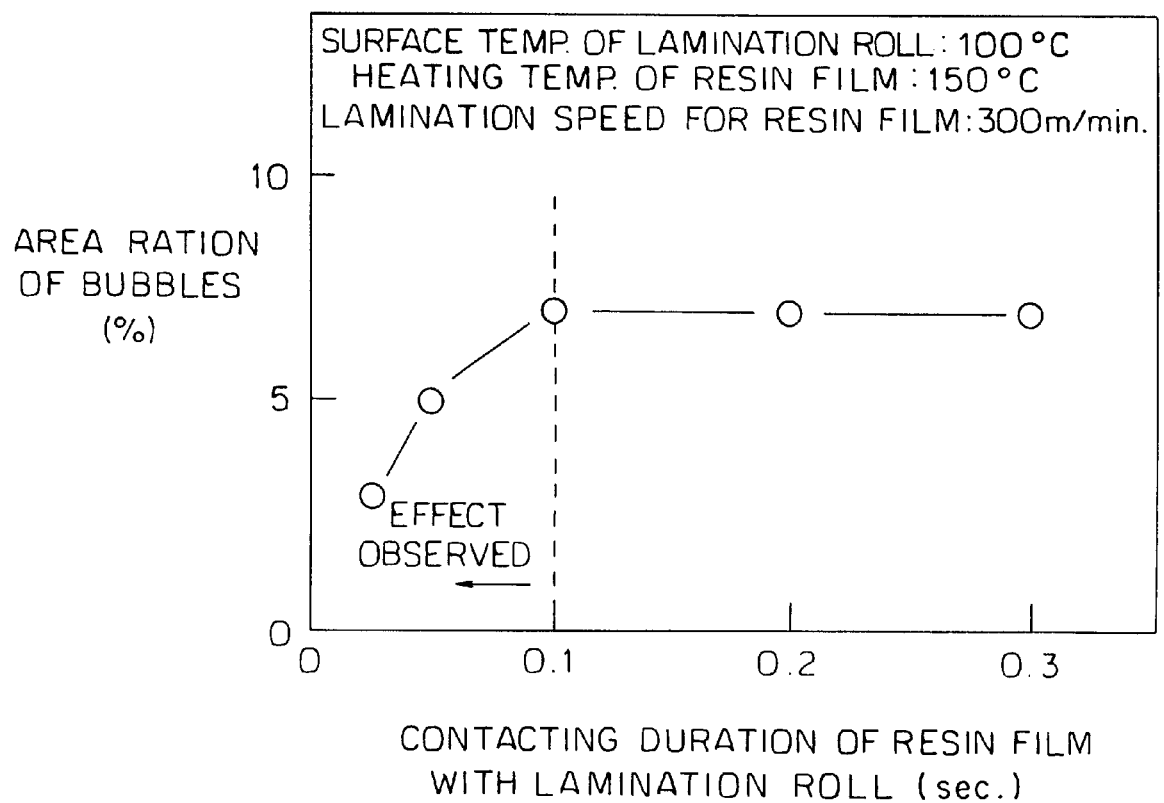
FIG. 2 is a graph showing the relation between a contacting duration of a resin film with laminating rolls and an area ratio of bubbles.

As mentioned above, it is necessary to maintain the temperature of the resin film 5 which is heated to below the softening temperature equal to or higher than the surface temperature of the laminating roll 7. However, even though the resin film 5 is heated to the predetermined temperature by the heating roll 6, it is rapidly cooled by the atmosphere because of its thinness as soon as it is away from the heating roll 6. Therefore, it is preferable to dispose the heating roll 6 adjacent to the laminating roll 7 as close as possible. Further, as shown in FIG. 3, a second heating means 12 may be provided between the heating roll 6 and the laminating roll 7. Although the metal sheet 1 is heated to a temperature of at least the melting point of the resin film 5 so that the resin film 5 may be heat-bonded to the metal sheet 1 and laminated thereon by nipping the resin film 5 and the metal sheet 1 together using the laminating rolls 7, the surface temperature of the laminating roll 7 is set to a low temperature for cooling the resin film 5 so as to prevent the whole resin film 5 from being melted. Accordingly, the temperature of the heated resin film 5 is rapidly lowered when it comes into contact with the laminating roll 7. Therefore, the shorter the contacting duration of the resin film 5 with the laminating roll 7 is, the resin film 5 can be fed in the nip of the laminating rolls at the higher temperature then the surface temperature of the laminating roll 7. As one example, FIG. 2 shows the resultant area ratio of the bubbles included between the resin film and the metal sheet when the resin film is laminated onto the metal sheet by varying the contact duration of the resin film with the laminating roll. When the contacting duration is within 0.1 second, a small amount of bubbles are included. It seems that if the contacting duration is within 0.1 second, the resin film can be fed in the nip of the laminating rolls with its temperature maintained higher than the surface temperature of the laminating roll, since it is not so cooled by the atmosphere. Thus, the shorter the contacting duration of the resin film with the laminating roll is, the less the bubbles are included. In case where using a thicker resin film of 25 μm or more, or a thinner resin film of 5 μm or less, such difference may possibly have a little influence on the amount of included bubbles according to the contacting duration of the resin film with the laminating roll. However, recently, resin coated metal sheets as can stocks usually employ a resin film of 5 to 50 μm thick, so a resin film of 25 μm thick is used as a standard resin film, and the upper limit of contacting duration of the resin film with the laminating roll is determined to be 0.1 second based on a case of using this standard resin film. The contacting duration of the resin film 5 with the laminating roll 7 can be controlled by adjusted the winding angle of the resin film 5 around the laminating roll 7. The adjustment of the winding angle can be performed by shifting the heating roll 6. As mentioned previously, it is preferable to shift the heating roll in the right and left directions, that is, perpendicularly to the advance direction of the metal sheet 1 on the plan of FIG. 1, since the winding angle can remarkably be changed by a small shift distance of the heating roll in the above mentioned direction. As clearly shown in FIG. 1, when the heating roll 6 is shifted closer to the metal sheet 1, the resultant contacting duration of the resin film 5 and the laminating roll 7 becomes short, but when the heating roll 6 is so much close to the metal sheet 1, the resin film 5 and the metal sheet 1 comes across each other before they come in a nip of the laminating rolls, resulting in occurrence of wrinkles of the resin film after they are laminated to each other by the pressing operation of the laminating rolls 7. Therefore, it is necessary to set the contacting duration of the resin film 5 with the lamination roll 7 within a short duration on the condition that the resin film does not suffer wrinkles after lamination.

As mentioned above, the resin film 5 is heated by the contact with the heating roll 6. Besides, it is possible to control the heating temperature of the resin film 5 by firstly shifting the heating roll 6, which also serves as a deflector roll, in the left and right directions on the plane of FIG. 1 and secondly shifting the second deflector roll 11, which is disposed between the thermoplastic resin film supplying means 4 and the heating roll 6, in the up-and downward directions so as to vary the winding angle of the resin film 5 around the heating roll 6 thereby adjusting a contacting length of the resin film 5 with the heating roll 6. The second deflector roll 11 may be moved in the up-and downward directions as mentioned above, or may be moved in the left and right directions and oblique direction, or an arc-shaped direction. Further, the second deflector roll 11 may be provided with a heating device for preheating the resin film 5 so as to assist the heating by the heating roll 6. Furthermore, as shown in FIG. 3, a second heating means 12 may be provided between the heating roll 6 and the laminating roll 7. In this case, since both the heating roll 6 and the heating means 12 co-operate for heating, the resin film 5 can be sufficiently heated to a predetermined temperature and can be laminated onto the metal sheet 1 at higher speed. Also, the resin film 5 can be heated closely until it comes in contact with the laminating roll 7. Still further, it may be possible not to permit the heating roll 6 to work as heating means but work as only deflector roll and permit only the second heating means 12 to heat the resin film 5, or permit both the second deflector roll 11 equipped with the heating device and the second heating means 12 to heat the resin film 5. As the second heating means 12, an infrared heater may preferably be used since it is capable of quickly heating.

The reason is not so obvious why it is possible to reduce bubbles included between the laminated resin film and the metal sheet by the technique of heating the resin film to a predetermined temperature below the softening temperature thereof, and bringing it into contact with the laminating roll, thereby laminating the resin film to the metal sheet. However, after observation on the condition and configuration of the bubbles included in the resin coated metal sheet, some characteristics have been remarked as follows.

(1) The bubbles are mainly present at concave portions of the metal sheet surface having roughness with concaves and convexes.

(2) The bubbles thus present have diameters ranging from 10 μm to some hundreds μm. It is thought from these characteristics that the bubbles are mainly generated in a case where the resin that is melted within at longest some 10 mill-seconds cannot fully fill up such concave portions of the metal sheet surface directly after the resin film enter the nip of the laminating rolls. Namely, it is thought that the bubbles are generated due to insufficient melting of the resin film that is to be made to contact with the heated metal sheet. In the present invention, the resin film is heated to a predetermined temperature below the softening temperature thereof and fed in the nip of the laminating rolls with such conditions retained. Accordingly, the resin film has a surface temperature of its contacting side with the metal sheet more rapidly raised through the thermal transfer from the higher heated metal sheet, and thus the resin film can be fully and rapidly melted even at high speed, which may be contributive to the reduction of bubbles included in the resin coated metal sheet.

Further, it is preferable to impart a tension of 2 to 14 N/m m² to the resin film 5 between the resin film supplying means 4 and the laminating roll 7. When the tension is 2 N/m m² or less even if the resin film 5 is heated to at most its softening temperature, it is impossible to sufficiently reduce bubbles. On the other hand, when the tension is 14 N/m m² or more, the shrinkage of the resin film 5 at the time of lamination thereof to the metal sheet becomes unfavorably remarkable. In this case, besides, if a resin coated metal sheet having such resin film laminated thereon is formed into a can such as stretch-formed and drawn can, which is subjected to heavy forming, the resin film will be easily peeled off. Such tension imparting means can be provided, for example, as a mechanism for selecting a supplying speed of the resin film 5 by the resin film supplying means 4 to be lower than the supplying speed of the metal sheet 1 by the metal sheet supplying means (not shown).

As a resin film to be laminated onto a least one side of the metal sheet according to the present invention, a single layer or multi-layer resin film mainly including a resin selected from the group consisting of polyester resin, polyolefin resin, polyamid resin, polycarbonate resin, and so on, or blended resin film including two or more resins selected from the above mentioned group, or a copolymerization resin film can be suitably selected for uses. Particularly, in a case for use in cans such as deep-drawn can and stretch-formed and drawn can, which are subjected to heavy forming, a copolymerization polyester resin film including polyethylene terephthalate and recurring unit of ethylene terephthalate as a main constituent, or a polyester resin film including polybutylene terephthalate and recurring unit of butylene terephthalate as a main constituent, or a blended polyester resin film including at least two polyester resins selected from those polyester resins, or a multi-layer polyester resin film having at least two layer of polyester resins selected from the above mentioned polyester resins laminated to each other can be used. Further, a polycarbonate resin film or a blended resin film including polycarbonate resin and at least one polyester resin selected from the above mentioned polyester resin, or a multi-layer resin film having a layer of polycarbonate and at least two layers of polyester resins selected from the above mentioned polyester resins laminated to each other can be used. Such a resin film may preferably be prepared by forming at least one resin into a film using a known extruder, then biaxially orienting the resin film, and heat setting it to produce a biaxially oriented resin film.

The resin film for lamination may preferably have a thickness of 5 to 50 $\mu$m and more preferably 10 to 30 $\mu$m. When the thickness of the resin film is 5 $\mu$m or less, it is difficult to laminate such resin film to the metal sheet continuously at high speed. On the other hand, when the thickness of the resin film for lamination is 50 $\mu$m or more, this is economically unfavorable compared with epoxy-base resin coating which is widely used for the manufacture of cans.

Next, as a metal sheet for use in the resin coated metal sheet of the present invention, a surface-treated steel strip or aluminum alloy strip can be used. As for the steel sheet, it is not necessary to restrict its steel composition in particular as far as it is endurable to heavy forming. For instance, a low carbon cold rolled steel sheet of 0.15 to 0.30 mm in thickness, which is much used for cans, may preferably be used. Further, a steel sheet provided with a surface layer of hydrated chromium oxide for attaining excellent adhesion after forming thereof to a resin film to be laminated thereon, and especially, a steel sheet provided with a dual-layered film composed of a metallic chromium as the lower layer and a hydrated chromium oxide as the upper layer (so-called Tin-Free-Steel) (TFS)) may preferably use used. Furthermore, a steel sheet, the surface of which is at first provided with a multi-layer coating or an alloy coating composed of one or more selected from the group of Sn, Ni, Al and the like, and then provided with the above mentioned dual-layered film thereon as the upper layer, can be used. As for the aluminum alloy sheet, also it is not necessary to restrict its alloy composition as far as it is endurable to heavy forming. However, a 300 series or 5000 series of aluminum alloy sheet, which are much used for can, may preferably be used from the viewpoint of cost and formability. Further, an aluminum alloy sheet, which is surface treated by known techniques such as treatment in electrolytic chromic acid solution, dipping treatment in chromic acid solution phosphoric acid chromating, etching by the use of an alkali solution or an acid solution, and anodizing, may more preferably be used. In particular, in the case where the steel sheet or the aluminum alloy sheet is provided on the surface thereof with the above mentioned dual-layered film, the coating weight of hydrated chromium oxide may preferably be 3 to 25 mg/m² and more preferably 7 to 20 mg/ m² as chromium in view of adhesion after forming thereof to the resin film to be laminated thereon. The metallic chromium is not specifically limited but may preferably be 10 to 200 mg/m² and more preferably 30 to 100 mg/m² in view of corrosion resistance thereof after forming and adhesion after forming thereof to the resin film to be laminated thereon.

The resin film 5 can be directly laminated onto the metal sheet 1. Or, a thermosetting adhesive layer of epoxy-phenol resin or the like can be provided between the resin film 5 and the metal sheet 1 so as to laminate them together. Namely, either a surface of the resin film 5 or a surface of the metal sheet 1, i.e., the surface that is to be bonded to the other, is in advance coated with the thermosetting adhesive so that the resin film can be laminated to the metal sheet with the thermosetting adhesive layer interposed between them.

EXAMPLES

Preferred embodiments of the method of and the apparatus for manufacturing the resin coated metal sheet of the present invention are now explained below with reference to the drawings.

A coil, around which a 0.20 mm thick TFS strip (denoted by symbol 1 in FIG. 1 and containing 105 mg/m² of metallic chromium and 15 mg/m² of hydrated chromium oxide by the weight of chromium) is coiled and is inserted in an uncoiler. The TFS strip is continuously uncoiled at a certain supplying speed as shown in Table 1, and made to contact with a jacket roll (2 in FIG. 1) having a heat temperature of 230° C. so as to be heated, and further made to contact with a pair of heating rolls (3 in FIG. 1) for final heating to be heated to 245° C. On the other hand, two coils, around which a 25 $\mu$m thick biaxially oriented copolyester resin film (5 in FIG. 1 and containing 88 mol % of polyethylene terephthalate and 12 mol % of polyethylene isophthalate) is coiled, respectively, are inserted in uncoilers (4 in FIG. 4) for supplying the resin film, which are respectively disposed on both sides with regard to the TFS, which advances continuously. The resin film is continuously uncoiled at lower speed than the supplying speed for the TFS while a certain tension as shown in Table 1 is imparted the resin film. The resin film is made to contact with a deflector roll (11 in FIG. 1) so that its advance direction is changed. Then, the resin film is made to contact with a resin film heating roll (6 in FIG. 1) having a certain heat temperature as shown in Table 1 to be heated. Further, the heated biaxial oriented copolyester resin film and the before-mentioned heated TFS are nipped by a pair of laminating rolls (7 in FIG. 1) having a heat temperature of 120° C., and a lamination of the resin film and the TFS is completed in a certain duration as shown in Table 1. Thereafter, the TFS, which is thus coated with the biaxially oriented copolyester resin film (8 in FIG. 1), is guided into a quenching tank (9 in FIG. 1) disposed below the laminating rolls and filled with water to be rapidly quenched and dried. Then, the resin coated TFS is coiled around a coiler (10 in FIG. 1).

Inclusion degree of bubbles in the resin coated metal sheet thus obtained and adhesion after forming of the laminated resin film were evaluated in the following manners.

(1) Inclusion degree of bubbles

The obtained resin coated metal sheet was cut into pieces of 50 mm×50 mm. Optionally selected three pieces among them were respectively measured with an area occupied by bubbles in a field of view of 1 mm×1 mm thereof through a scanning acoustic microscope. A ratio of the area occupied by bubbles to the whole measured area was expressed by a percentage (%) and a mean value of all area ratios was defined as an area ratio of bubbles.

(2) Adhesion after forming of the laminated resin film

The obtained resin coated metal sheet was blanked out with a diameter of 160 mm and formed into a drawn can of 100 mm in diameter. Then, it was redrawn to be a redrawn can of 80 mm in diameter. The redrawn can was stretched and ironed simultaneiously by the composite forming to be a drawn and ironed can of 66 mm in diameter. This composite forming was carried out under the following conditions. That is, a distance between the redrawing portion and the ironing portion, which portion corresponds to a top end portion of the can, was 20 mm, a should radius of a redrawn die was 1:5 times the sheet thickness, a clearance between the redrawn die and a punch was 1.0 time the sheet thickness, and a clearance of the ironing portion is set of 50% of the original sheet thickness. Then, the top end of the can was trimmed by a known manner and subjected to neck-in forming and flange forming.

The obtained can body was observed with regard to a peel-off degree of the resin film from the can wall thereof through a naked eye and evaluated on the basis of the following standard.

: no peel-off at all, ○: a slight peel-off but no practical problem, : considerable peel-off, X: peel-off all over the top end portion Evaluation results are shown in Tables 1 and 2.

Table 1: Laminating conditions for resin film and characteristics of the resultant resin coated metal sheet (1)

Table 2: Laminating conditions for resin film and characteristics of the resultant resin coated metal sheet (2)

These results are summarized as follows.

(1) When the resin film is heated to a temperature of at least the surface temperature of the laminating roll and below the softening temperature of the resin film, and made to contact with the laminating roll in a shorter duration, it is possible to obtain a resin coated metal sheet in which a less amount of bubble is included between the laminated resin film and the metal sheet, and the laminated resin film is excellent in adhesion after forming.

(2) When the resin film that is not heated is laminated onto the metal sheet at high speed, a more amount of bubble is included between the laminated resin film and therefore it is not possible to obtain a resin coated metal sheet excellent in the adhesion after forming of the laminated resin film.

(3) When the resin film is heated to a temperature lower than the surface temperature of the laminating roll, a slightly less amount of bubble is included between the laminated resin film and the metal sheet compared with a case of the resin film being left at a normal temperature, and therefore the adhesion after forming of the laminated resin film is more or less improved, but this can be not enough.

(4) When the resin film is made to contact with the laminating roll for a longer duration, even if the resin film is heated to a temperature of at least the surface temperature of the laminating roll and below the softening temperature of the resin film, a more amount of bubble is included between the laminated resin film and the metal sheet, and therefore it is not possible to obtain a resin coated metal sheet excellent in the adhesion after forming of the laminated resin film.

Clearly from the above mentioned results, according to the method of and the apparatus for manufacturing a resin coated metal sheet of the present invention, it is possible to manufacture a resin coated metal sheet in which a reduced amount of bubble is included between the laminated resin film and the metal sheet, and the laminated resin has such excellent adhesion after forming as not to be peeled off even when the resin coated metal sheet is subjected to heavy forming.

POSSIBILITY IN THE FIELD

In case where a thermoplastic resin film is laminated onto a metal sheet strip, which advances continuously, according to the manufacturing method for a resin coated metal sheet of the present invention, it is possible to reduce bubbles included between the laminated resin film and the metal sheet even when the resin film is laminated at a high speed of at least 200 m/min. It is therefore possible to manufacture a resin coated metal sheet excellent in adhesion after forming. Thus, the manufacturing method of the present invention is excellent in productivity and highly valuable in the industrial field.

TABLE 1

The laminating condition of the resin film and the characteristics of the resin coated metal sheet (1)

| Sample No. | Supplying speed of metal sheet (m/min.) | Temp. of resin film laminating roll (° C.) | Tension of resin film (N/mm²) | Contacting duration of resin film with lamination roll (second) | Area ratio of bubbles | Formarble adhesion | Division |
|---|---|---|---|---|---|---|---|
| 1 | 200 | room temp. | 10 | 0.06 | 18% | X | Comp. |
| 2 | 200 | 100 | 10 | 0.06 | 8% | Δ | Comp. |
| 3 | 200 | 120 | 10 | 0.06 | 6% | ⊚ | Ex. |
| 4 | 200 | 150 | 10 | 0.06 | 3% | ⊚ | Ex. |
| 5 | 200 | 170 | 10 | 0.06 | <3% | ⊚ | Ex. |
| 6 | 200 | 180 | 10 | 0.06 | not measured | | Comp. |
| 7 | 200 | 150 | 1.5 | 0.06 | 4% | ⊚ | Comp. |
| 8 | 200 | 150 | 2 | 0.06 | 3% | ⊚ | Ex. |
| 9 | 200 | 150 | 8 | 0.06 | <3% | ⊚ | Ex. |
| 10 | 200 | 150 | 14 | 0.06 | <3% | ○ | Ex. |

(Remark) Sample No 6: The resin film is elongated in the longitudinal direction and shrinked in the wiedth direction at the time of lamination

TABLE 2

The laminating condition of the resin film and the characteristics of the resin coated metal sheet (2)

| Sample No. | Supplying speed of metal sheet (m/min.) | Temp. of resin film laminating roll (° C.) | Tension of resin film (N/mm²) | Contacting duration of resin film with lamination roll (second) | Area ratio of bubbles | Formarble adhesion | Division |
|---|---|---|---|---|---|---|---|
| 11 | 200 | 150 | 16 | 0.06 | 3% | Δ | Comp. |
| 12 | 200 | 150 | 10 | 0.04 | <3% | ⊚ | Ex. |
| 13 | 200 | 150 | 10 | 0.08 | 5% | ⊚ | Ex. |
| 14 | 200 | 150 | 10 | 0.10 | 11% | ○ | Ex. |
| 15 | 200 | 150 | 10 | 0.15 | 15% | X | Comp. |
| 16 | 300 | 150 | 10 | 0.03 | 5% | ⊚ | Ex. |
| 17 | 400 | 150 | 10 | 0.02 | 7% | ⊚ | Ex. |
| 18 | 150 | 150 | 10 | 0.20 | 8% | X | Comp. |

What is claimed is:

1. A method of manufacturing a thermoplastic resin coated metal sheet, comprising:
   continuously feeding a thermoplastic resin film having a melting point temperature and a softening point temperature toward a nip between a pair of laminating rolls, said laminating rolls having a first surface temperature which is lower than the softening temperature of said thermoplastic resin film;
   heating said thermoplastic resin film to a temperature which is at least as great as said first temperature but which is below said softening temperature of said thermoplastic film;
   continuously advancing a metal sheet strip toward said nip and heating said metal sheet strip to a temperature of at least said melting point of said thermoplastic film; and
   laminating said heated thermoplastic resin film to said heated metal sheet at said nip by bringing said heated thermoplastic resin film into contact with a surface of said heated metal sheet strip at said nip of said laminating rolls.

2. A method of manufacturing a thermoplastic resin coated metal sheet according to claim 1, characterized in that when said heated thermoplastic resin film is brought into contact with said metal sheet and both the thermoplastic resin film and the metal sheet are nipped to be laminated to each other by said laminating rolls, said heated thermoplastic resin film and said laminating rolls are made to contact with each other within 0.1 second.

3. An apparatus for manufacturing a thermoplastic resin coated metal sheet for use in the method of manufacturing a thermoplastic resin coated metal sheet according to claim 1, which includes a metal sheet supplying means for continuously feeding a metal sheet strip, a heating means for heating the metal sheet to a temperature of at least a melting point of a thermoplastic resin film, a pair of laminating rolls, and a thermoplastic resin film supplying means for continuously feeding a thermoplastic resin film between the laminating rolls and the metal sheet, the apparatus further including a thermoplastic resin film heating means for heating the thermoplastic resin film to a temperature of at least a surface temperature of the laminating rolls and below a softening temperature of the thermoplastic resin film directly before the thermoplastic resin film is made to contact with the metal sheet.

4. An apparatus for manufacturing a thermoplastic resin coated metal sheet according to claim 3, characterized in that the thermoplastic resin film heating means is a heating roll which is disposed between the thermoplastic resin film supplying means and the laminating rolls so as to come into contact with one surface of the thermoplastic resin film.

5. An apparatus for manufacturing a thermoplastic resin coated metal sheet according to claim 3 characterized in that said heating roll also serves as a deflector roll which is disposed movably both in the advance direction of the metal sheet and the perpendicular direction thereof so as to permit a winding angle of the thermoplastic resin film around the laminating roll to be changed.

6. An apparatus for manufacturing a thermoplastic resin coated metal sheet according to claim 3 characterized in that a second heating means is provided between the heating roll and the laminating rolls for heating said thermoplastic resin film or for inhibiting heat loss of the thermoplastic resin film.

7. An apparatus for manufacturing a thermoplastic resin coated metal sheet according to claim 6, characterized in that the second heating means is an infrared heater.

8. An apparatus for manufacturing a thermoplastic resin coated metal sheet according to claim 4 characterized in that a second deflector roll is provided between the thermoplastic resin film supplying means and the heating roll so as to come into contact with one surface of the thermoplastic resin film and be disposed movably in the direction perpendicular to the advance direction of the thermoplastic resin film.

9. The method of claim 1 wherein said metal sheet strip and said thermoplastic resin film are both advanced at a speed of at least about 200 m/min.

10. The method of claim 2 wherein said metal sheet strip and said thermoplastic resin film are both advanced at a speed of at least about 200 m/min.

11. The method of claim 1 wherein said first temperature is about 120–170° C.

12. The method of claim 2 wherein said first temperature is about 120–170° C.

13. An apparatus for manufacturing a thermoplastic resin coated metal sheet according to claim 4, characterized in that said heating roll also serves as a deflector roll which is disposed movably both in the advance direction of the metal sheet and the perpendicular direction thereof so as to permit a winding angle of the thermoplastic resin film around the laminating roll to be changed.

14. An apparatus for manufacturing a thermoplastic resin coated metal sheet according to claim 13, characterized in that a second heating means is provided between the heating roll and the laminating rolls for heating said thermoplastic resin film or for inhibiting heat loss of the thermoplastic resin film.

15. An apparatus for manufacturing a thermoplastic resin coated metal sheet according to claim 14, characterized in that a second deflector roll is provided between the thermoplastic resin film supplying means and the heating roll so as to come into contact with one surface of the thermoplastic resin film and be disposed movably in the direction perpendicular to the advance direction of the thermoplastic resin film.

* * * * *